Figures 1, 2:
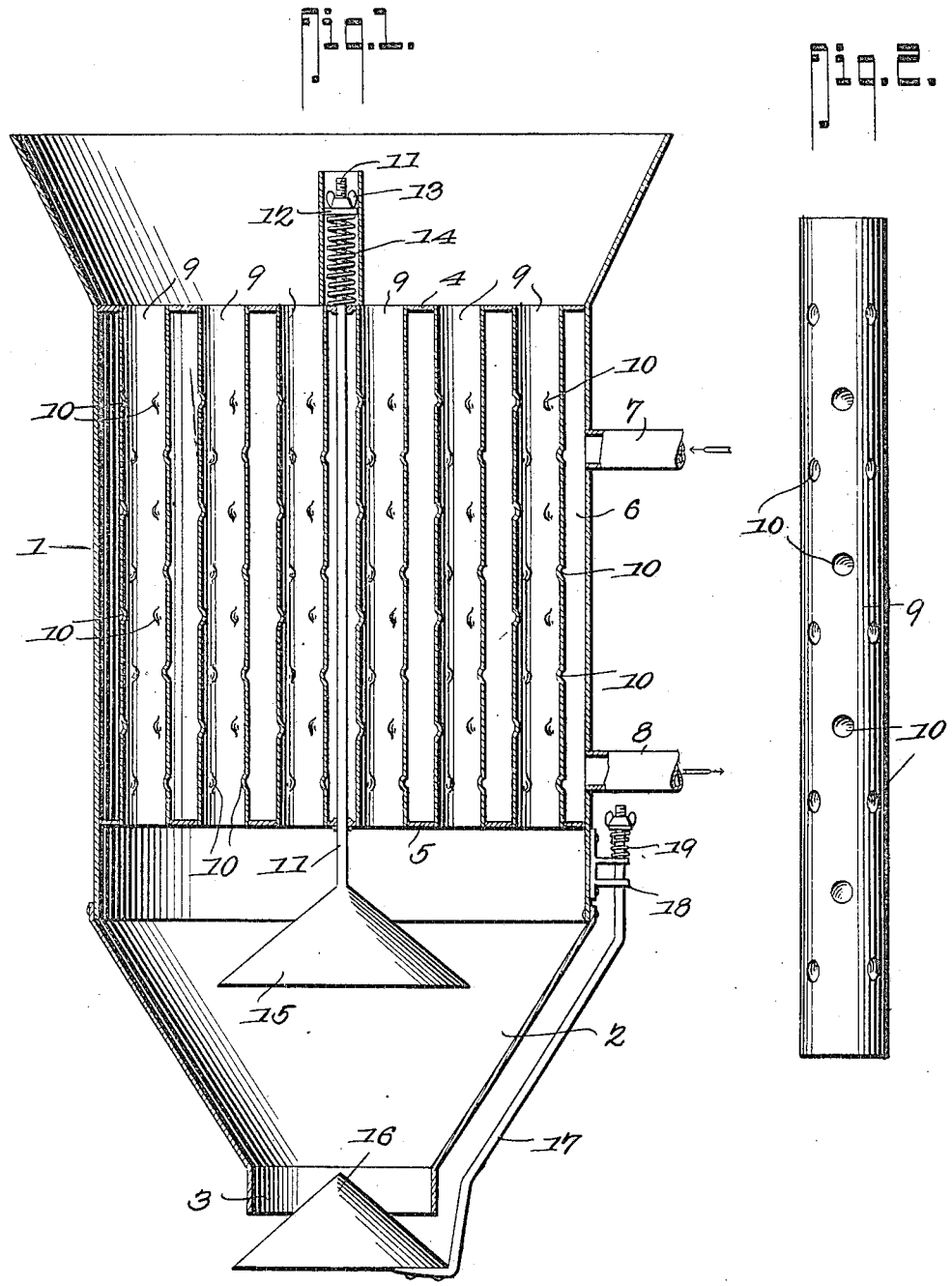

No. 831,570. PATENTED SEPT. 25, 1906.
P. PROVOST.
GRAIN HEATER AND DRIER.
APPLICATION FILED AUG. 24, 1904.

Peter Provost,
Inventor.

Witnesses

UNITED STATES PATENT OFFICE.

PETER PROVOST, OF MENOMINEE, MICHIGAN.

GRAIN HEATER AND DRIER.

No. 831,570.      Specification of Letters Patent.      Patented Sept. 25, 1906.

Application filed August 24, 1904. Serial No. 222,009.

*To all whom it may concern:*

Be it known that I, PETER PROVOST, a citizen of the United States, residing at Menominee, in the county of Menominee and State of Michigan, have invented a new and useful Grain Heater and Drier, of which the following is a specification.

This invention relates to appliances for heating and drying wheat and other grain; and it has for its object to increase the efficiency of the operation of heating and drying by causing the individual grains to be tilted and agitated so as to expose their entire surfaces equally and entirely to the heating and drying influences.

The invention consists in a steam heater or drier having tubular passages for the grain that is to be operated upon, and the invention consists specifically in the improved construction of said tubular passages, whereby the grains will be operated upon in the manner described.

The invention further consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a vertical sectional view of a grain heater and drier embodying the principles of the invention. Fig. 2 is a side elevation of one of the grain-tubes.

Corresponding parts in both figures are indicated by similar numerals of reference.

1 designates a casing, which is mainly cylindrical in shape, having a contracted or funnel-shaped bottom 2, the lower end of which has a cylindrical outlet 3. The casing 1 is provided with diaphragms 4 and 5, between which is the steam-space 6, which is supplied with steam through an inlet 7, an outlet 8 being provided near the lower end of the steam-space for the escape of steam and water of condensation.

The diaphragms 4 and 5 are connected by a plurality of tubes or passages 9. These tubes, of which any desired number may be used and which may be of any suitable dimensions, are preferably constructed of metal, such as brass or copper, and are preferably drawn or jointless. These tubes are provided upon their inner surfaces with protuberances 10, which are formed at regular intervals, suitably spaced apart. Under this preferred arrangement these protuberances are disposed in annular series, those of alternate series being staggered and those which are in longitudinal alinement being spaced apart about two inches more or less. These protuberances may be conical, approximately semispherical, or of any other suitable shape, the approximately semispherical shape being preferred. These protuberances will serve to engage and to some extent to obstruct the passage of grain through the tubes, the effect of the grains coming in contact with said protuberances being to tilt the individual grains and to cause them to be partially rotated, with the effect of exposing the sides or surfaces of the grains entirely and equally to the drying and heating influences of the interor surfaces of the tubes, which in operation are heated by the live steam contained in the steam-space.

In the manufacture of the tubes 9, the metal of which is only of moderate thickness, I find it advantageous to fill said tubes with a temporary core or mandrel of some suitable material, such as rosin, which may be readily introduced into the tubes in a molten state and which will quickly harden to form a core. While this core is contained in the tubes, the latter may readily by means of an ordinary punching device be indented at the proper intervals to form the inwardly-extending protuberances 10. After the latter have been properly formed the pipes are subjected to heat sufficiently to melt the core material contained therein, which is thus readily removed.

It will be understood that in the manufacture and use of this device it is of the greatest importance that the tubes or pipes be of the proper dimensions, or rather of the proper interior diameter, and also that the interior protuberances be properly spaced and disposed. The main object is to cause the said protuberances to act as far as possible upon every individual grain and to prevent the grain from passing through the tubes in what might be termed "solid columns" retarded only by frictional contact with the walls of the tubes. The protuberances should only be large enough to deal with individual grains as contradistinguished from deflectors used for agitating or deflecting the course of a mass or body of grain. It follows then that tubes exceeding a certain diameter—say one inch in internal diameter—would be practically useless for the purposes of the invention. A tube three-fourths of an inch in internal diameter would probably be preferable. In a tube of this size the protuberances may be disposed in annular series each of three protuberances, the said series being spaced about one inch apart, thus making the distance between the protuberances disposed in longitudinal alinement about two inches. I do not wish to be held to the exact dimensions here given; but it will be readily seen that any considerable deviation therefrom would result in a structure which would not be operative for the purposes of my invention. The protuberances may be about one-fourth of an inch in diameter.

Extending through the diaphragms 4 and 5 is a vertically-movable rod 11, provided at its upper end with a washer 12 and a nut 13, between which and the upper diaphragm 4 may be placed a spring 14. The lower end of the rod carries a conical deflector 15, whereby the grain passing through the tubes 9 will be spread and scattered previous to passing through the exit-tube at the lower end of the funnel 2. Below said exit is supported a conical deflector 16, said deflector being mounted upon a vertically-movable rod 17, extending through supporting-brackets 18, and supported, if desired, by means of a spring 19.

When grain is passing rapidly through the heater, it is oftentimes the case that the lower part formed by the funnel-shaped bottom 2 is entirely filled with grain. When this is the case, the tendency would be for the grain to pass rapidly through the centrally-disposed tubes 9 or through the tubes disposed directly above the exit, while the grain contained in the outermost tubes or those remote from the exit would be stationary or pass through the tubes comparatively slowly, thereby causing the grain to be unevenly heated, it being exposed to the heating influences for periods of unequal duration. The arrangement of the conical deflector 15 overcomes this disadvantage, the passage of grain through the central tubes and through those near the center being thereby retarded, while the passage of grain through the outer tubes is not obstructed. This deflector, moreover, may be adjusted according to the rapidity with which grain is permitted to pass through the device, and being spring-supported it will automatically seek its proper position.

The operation and advantages of this invention will be readily understood from the foregoing description, taken in connection with the accompanying drawings. The grain which is to be operated upon is caused to pass through the tubes 9, which are heated to the necessary extent by live steam introduced into the steam-space 6 through the pipe 7. The grain will be discharged from the tubes 10 partly upon the deflector 15 and partly upon the funnel-shaped bottom 2, all of the grain being discharged through the exit 3 upon the deflector 16. The deflectors 15 and 16, which, as will be seen, are supported, respectively, upon the springs 14 and 19, may be adjusted according to the rapidity with which grain is caused to pass through the heating device.

Having thus described the invention, what is claimed is—

1. In a grain-heater, a casing including a steam-space, and grain-conducting pipes passing through said steam-space; said pipes being provided upon their inner surfaces with spaced protuberances having rounded upper sides said pipes and protuberances being of such relative dimensions as to operate upon, displace, and overturn individual grains.

2. In a grain-heater, a grain-conducting pipe provided with exterior indentations forming inwardly-extending unbroken protuberances having rounded upper sides, and exposed for contact with grain passing through said pipe, said pipe and protuberances being of dimensions to operate upon individual grains rather than upon the bulk or mass of grain passing through the pipe.

3. In a grain-heater, a casing, a diaphragm in said casing, grain-pipes connecting said diaphragms, steam inlet and exit pipes connected with the space between the diaphragms, a rod extending through the latter and having a conical deflector at its lower end, a contracted exit at the lower end of the casing, and a conical deflector supported below said exit.

4. In a grain-heater, a casing, a diaphragm in said casing, grain-pipes connecting said diaphragms, steam inlet and exit pipes connected with the space between the diaphragms, a spring-supported rod extending through the latter and having a conical deflector at its lower end, a contracted exit at the lower end of the casing, and a spring-supported conical deflector below said exit.

In testimony that I claim the foregoing as my own I have hereto affixed my signature in the presence of two witnesses.

PETER PROVOST.

Witnesses:
AUGUSTA J. HOLMES,
GERTRUDE MURRAY.